(No Model.)  3 Sheets—Sheet 1.

J. PROEGER.
MANUFACTURE OF HOLLOW GLASS ARTICLES.

No. 580,716. Patented Apr. 13, 1897.

WITNESSES
Warren M. Swartz
W. B. Corwin

INVENTOR
Julius Proeger
by his attorneys
W. Bakewell & Sons (No Model.) 3 Sheets—Sheet 2.
J. PROEGER.
MANUFACTURE OF HOLLOW GLASS ARTICLES.

No. 580,716. Patented Apr. 13, 1897.

WITNESSES
INVENTOR (No Model.) 3 Sheets—Sheet 3.

J. PROEGER.
MANUFACTURE OF HOLLOW GLASS ARTICLES.

No. 580,716. Patented Apr. 13, 1897.

WITNESSES INVENTOR

UNITED STATES PATENT OFFICE.

JULIUS PROEGER, OF GREENSBURG, PENNSYLVANIA.

MANUFACTURE OF HOLLOW GLASS ARTICLES.

SPECIFICATION forming part of Letters Patent No. 580,716, dated April 13, 1897.

Application filed June 25, 1894. Serial No. 515,607. (No model.)

*To all whom it may concern:*

Be it known that I, JULIUS PROEGER, of Greensburg, in the county of Westmoreland and State of Pennsylvania, have invented a new and useful Improvement in the Manufacture of Hollow Glass Articles, of which the following is a full, clear, and exact description, reference being had to the accompanying drawings, forming part of this specification, in which—

Figure 1:
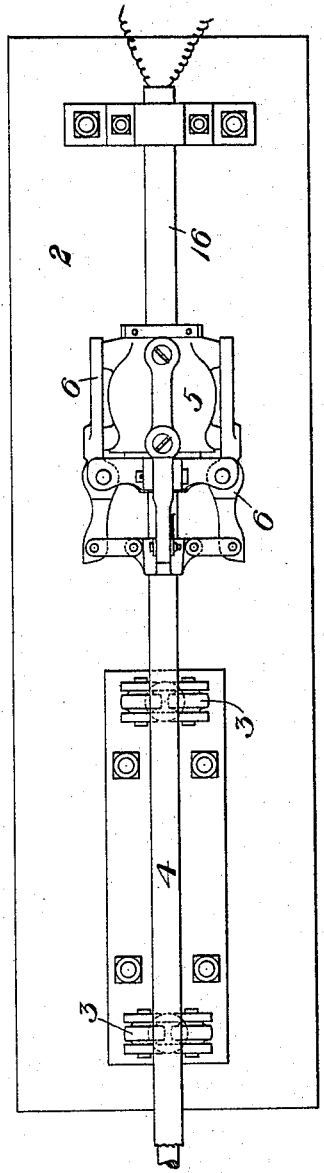
Figure 2:
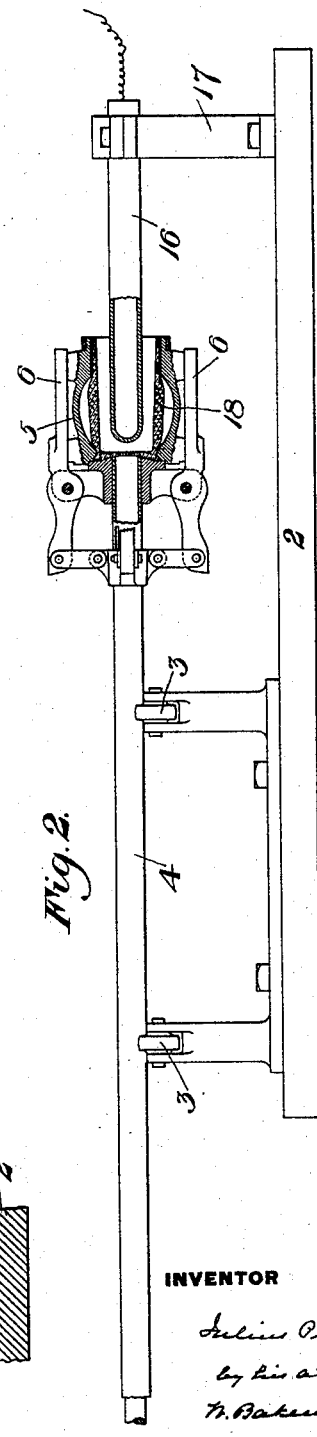
Figure 3:
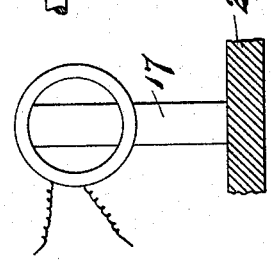
Figure 4:
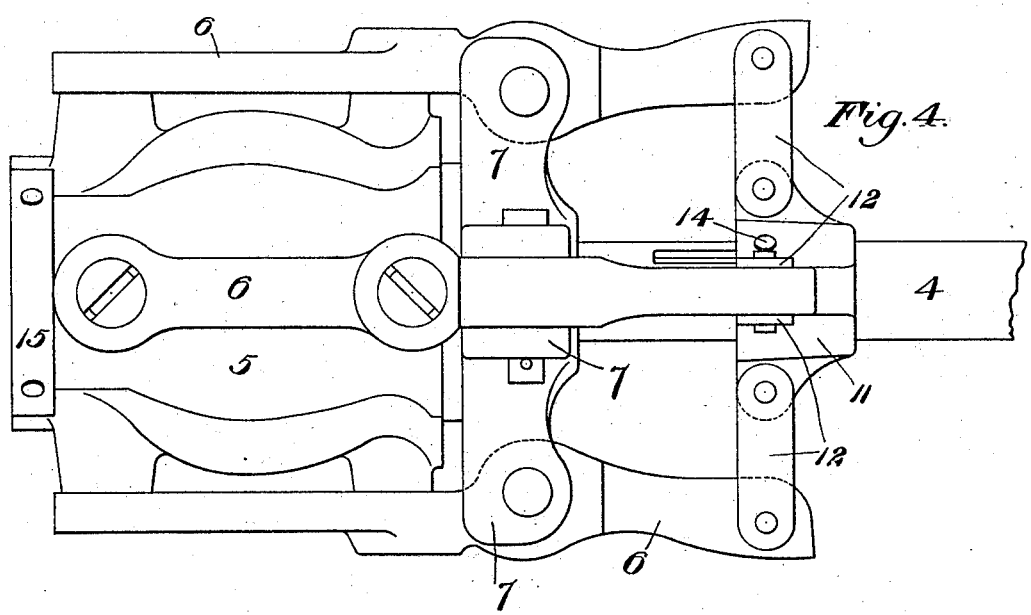
Figure 5:
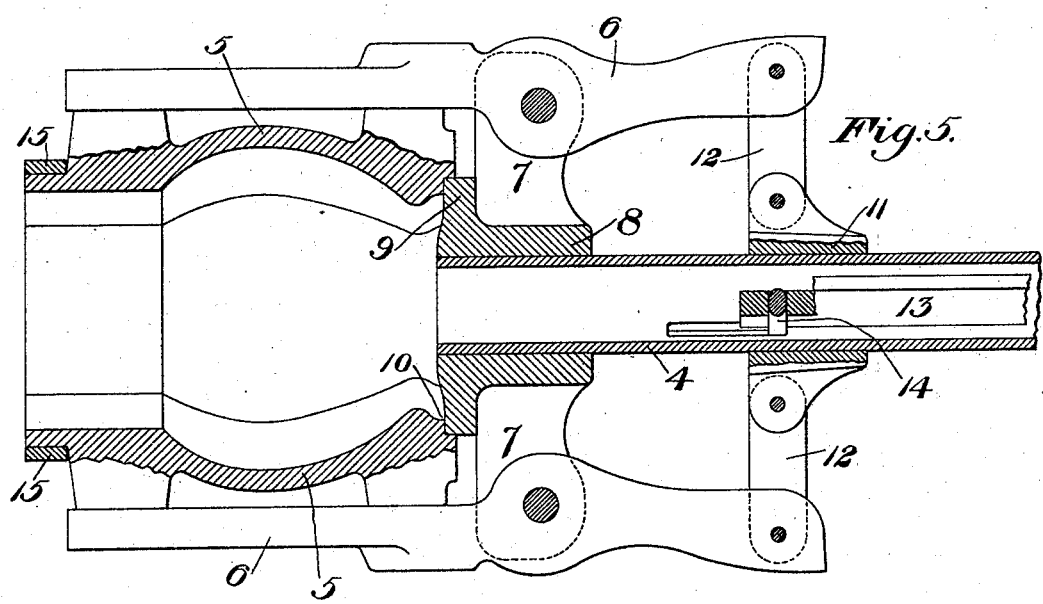
Figure 6:
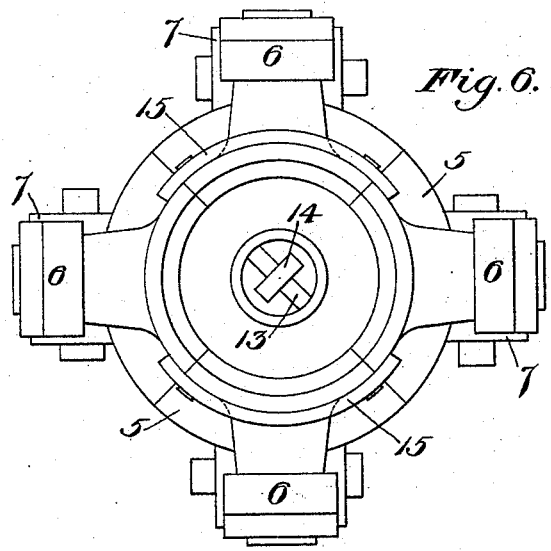
Figure 7:
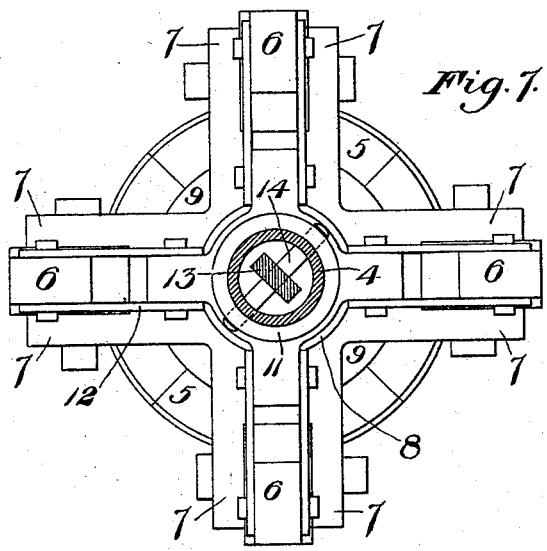

Figure 1 is a plan view of a glass-working table, showing the operation of my invention. Fig. 2 is a side elevation of the same. Fig. 3 is a detailed view of a modified form of heater. Fig. 4 is an enlarged side elevation of the forming-snap I employ. Fig. 5 is a similar view with parts broken away to show its interior. Fig. 6 is a top plan view, and Fig. 7 a bottom plan view, with the operating-handle in section.

Like symbols of reference indicate like parts in each view.

My invention relates to the manufacture of hollow glassware, and is designed to afford an improved method therefor.

Heretofore a blank having been blown and placed in a snap it was thrust into a glory-hole furnace, and, being reheated therein, was expanded and formed to shape by hand manipulation. Many difficulties are present in this method, as the resulting articles are not uniform in size or shape, being molded by hand, and the use of highly-skilled labor is necessary. Moreover, where articles having a thin edge or a figured neck portion are made the reheating melts down the thin edge of the article or the sharp edges of the figures and greatly injures the appearance of the articles. This heating is necessary for the softening of the article sufficiently for reshaping, and as the edge or neck is necessarily subjected to the greatest heat its consequent injury has been unavoidable.

In my improved process the blank is placed in a snap and heated locally or merely in the parts which must change in shape, the neck and edge or other part desired remaining comparatively cool, thus preserving fine lines and thin edges. This heating is performed, preferably, by means of an internal electrical heater, over which the blank is pushed; and with this internal heater I use a "forming-snap," that is, a snap which not only clamps and holds the article, but also constitutes a mold or shaper therefor. The parts of the blank required having been heated by the internal heater, the blank is expanded within the former either by rotating the snap-rod, by a buffer, by compressed air, or otherwise, as desired. The local heating may also be done by means of an external heater, an ordinary snap being used.

In the drawings, 2 represents the operating-bench, having two sets of centering and supporting rollers 3, upon which rests the tubular handle 4 of my improved forming-snap. This forming-snap is more clearly shown in Figs. 4 to 7, and consists of curved sections 5, combined to form the mold-cavity, each section being carried upon a lever 6. The levers 6 are intermediately pivoted in yokes 7, projecting from a ring 8, this ring having a flange 9 at its upper end, forming the base of the mold, and being secured to the upper end of the tubular operating-handle. Each section is recessed near its bottom at 10 to fit snugly over the edge of the base 8. To operate the levers, I connect their lower ends with a sliding collar 11 upon the handle by means of pivoted links 12, this collar being connected to the inner operating-rod 13 by a pin 14 in the usual way. It will be noticed that the pivotal point of each section is below the matrix portion, so that the sections will rise slightly in an arc-shaped path when the sections are opened. This is an important feature, as in figured or intaglio work it has been difficult or impossible to separate ordinary molds therefrom.

Secured to the upper ends of two of the sections are curved plates 15, which when the sections are closed overlap the adjacent sections and guide and hold the sections in place.

Referring again to Figs. 1 and 2, 16 is an electrical heater held by a standard 17 directly in line with the two sets of centering-rollers, so that when the snap is laid upon the rollers and pushed forward the heater will enter the center of the forming-snap and heat the glass therein.

The method which I preferably employ is as follows: A glass blank such as shown at 18 in Fig. 2 having been pressed, is placed in the forming-snap, as shown. The snap is laid upon the rollers 3, and being centered thereby is pushed forward over the electrical heater, which softens the glass and renders it pliable, when the snap may be withdrawn from the heater, and being rotated upon the rollers the glass is thrown out against the sides of the snap. The glass may obviously be expanded by compressed air or gas or in any other desired manner after heating. The former-sections then being separated by their operating-rod the article is removed and the operations repeated.

In the use of my improved process it is not broadly necessary to use an interior heater or a forming-snap, as an electrical heating-ring, such as is shown in Fig. 3, may be employed with an ordinary snap in which the body of the article is exposed. The snap in this case being moved forward over the guide-rollers the glass article enters the heating-ring, and being thereby heated at the points desired is withdrawn and shaped by hand, as usual.

The essence of my process lies, broadly, in the local heating of the article, the portion heated being usually the body, thus preventing the destroying of thin edges and sharp lines of figures upon the rim or other portion, and though the use of a forming-snap and interior heater presents many advantages still their use is not essential. It is evident that gas or other heaters may be used in place of the electrical heaters, whether for interior or exterior use.

One or more of the former-sections of my improved snap may be stationary, and the number of the sections may be varied as desired, though if figured sections are employed I find that at least three sections are necessary.

The advantages of the invention will be appreciated by those skilled in the art. By the use of the forming-snap articles of the same size and contour may be turned out and without the manual skill necessary with the ordinary snap. A good imitation of cut glass may be made, since by the local heating the fine lines and edges are not melted down by the reheating necessary for expanding and forming the blank.

The snap is simple in construction and the steps of the process are few in number and easily performed.

Many variations in the form and construction of the several parts of the apparatus may be made by the skilled mechanic without departing from my invention, since

What I claim is—

1. The method of forming hollow glass articles, consisting in securing a blank within a forming-snap, heating the same internally, and then expanding the article against the walls of the forming-sections; substantially as described.

2. The method of forming hollow glass articles, consisting in securing a blank within a forming-snap, pushing the snap over an internal heater, and then withdrawing the snap, and rotating the same to expand the article within; substantially as described.

In testimony whereof I have hereunto set my hand.

JULIUS PROEGER.

Witnesses:
W. B. CORWIN,
C. BYRNES.